US00RE42844E

(19) United States
(12) Reissued Patent
Sprouse et al.

(10) Patent Number: US RE42,844 E
(45) Date of Reissued Patent: Oct. 18, 2011

(54) LINEAR TRACTOR DRY COAL EXTRUSION PUMP

(75) Inventors: Kenneth M. Sprouse, Northridge, CA (US); David R. Matthews, Simi Valley, CA (US)

(73) Assignee: Pratt & Whitney Rocketdyne, Inc., Canoga Park, CA (US)

(21) Appl. No.: 12/326,066

(22) Filed: Dec. 1, 2008

Related U.S. Patent Documents

Reissue of:
(64) Patent No.: 7,387,197
Issued: Jun. 17, 2008
Appl. No.: 11/520,154
PCT Filed: Sep. 13, 2006

(51) Int. Cl.
*B65G 15/00* (2006.01)
(52) U.S. Cl. ..... 198/626.1; 198/497; 415/5
(58) Field of Classification Search .... 198/626.1–626.5, 198/497, 643; 415/5
See application file for complete search history.

(56) References Cited

U.S. PATENT DOCUMENTS

| | | | | |
|---|---|---|---|---|
| 1,011,589 | A | 12/1911 | Curtis | |
| 1,740,821 | A * | 12/1929 | Kneuper | 198/497 |
| 2,380,144 | A * | 7/1945 | Bohannon | 198/635 |
| 3,245,517 | A | 4/1966 | Ward | |
| 3,844,398 | A | 10/1974 | Pinat | |
| 4,069,911 | A | 1/1978 | Ray | |
| 4,516,674 | A | 5/1985 | Firth | |
| 4,611,646 | A | 9/1986 | Wassmer et al. | |
| 4,988,239 | A | 1/1991 | Firth | |
| 5,051,041 | A | 9/1991 | Firth | |
| 5,094,340 | A | 3/1992 | Avakov | |
| 5,402,876 | A | 4/1995 | Hay | |
| 5,435,433 | A | 7/1995 | Jordan et al. | |
| 5,485,909 | A | 1/1996 | Hay | |
| 5,492,216 | A | 2/1996 | McCoy et al. | |
| 5,497,873 | A | 3/1996 | Hay | |
| 5,551,553 | A | 9/1996 | Hay | |
| 6,213,289 | B1 | 4/2001 | Hay et al. | |

(Continued)

OTHER PUBLICATIONS

Sprouse, K.M., Matthews, D.R., and Weber, G.F. "The PWR/DOE High-Pressure Ultra-Dense Phase Feed System and Rapid-Mix Multi-Element Injector for Gasification", Gasification Technologies Council meeting, Washington, D.C., Oct. 2006.

(Continued)

*Primary Examiner* — Mark A Deuble
(74) *Attorney, Agent, or Firm* — Carlson Gaskey & Olds PC

(57) ABSTRACT

A pump for transporting particulate material includes an inlet, an outlet, a passageway, a first and second load beam, a first and second scraper seal, and a first and second drive assembly. The inlet introduces the particulate material into the passageway and the outlet expels the particulate material from the passageway. The passageway is defined by a first belt assembly and a second belt assembly that are opposed to each other. The first and second load beams are positioned within the first belt assembly and the second belt assembly, respectively. The first scraper seal and a second scraper seal are positioned proximate the passageway and the outlet. The first drive assembly is positioned within an interior section of the first belt assembly and drives the first belt assembly and the second drive assembly is positioned within an interior section of the second belt assembly and drives the second belt assembly.

35 Claims, 6 Drawing Sheets

U.S. PATENT DOCUMENTS

| | | | | |
|---|---|---|---|---|
| 6,257,567 | B1 | 7/2001 | Hansmann et al. | |
| 6,296,110 | B1 | 10/2001 | van Zijderveld et al. | |
| 6,533,104 | B1 | 3/2003 | Starlinger-Huemer et al. | |
| 6,875,697 | B2 | 4/2005 | Trivedi | |
| 2004/0159426 | A1 * | 8/2004 | Austbo et al. | 166/77.3 |
| 2006/0243583 | A1 | 11/2006 | Sprouse et al. | |

OTHER PUBLICATIONS

Aldred D. and Saunders, T. "Successful Continuous Injection of Coal into Gasification and PFBC System Operating Pressures Exceeding 500 PSI—DOE Funded Program Results", Pittsburgh Coal Conference Gasification Technologies, 2005.

* cited by examiner

LINEAR TRACTOR DRY COAL EXTRUSION PUMP

Matter enclosed in heavy brackets [ ] appears in the original patent but forms no part of this reissue specification; matter printed in italics indicates the additions made by reissue.

STATEMENT REGARDING FEDERALLY SPONSORED RESEARCH OR DEVELOPMENT

This invention was made with the support of the United States Government under Contract No. DE-FC26-04NT42237 awarded by the Department of Energy (DOE). The United States Government has certain rights in the invention.

BACKGROUND OF THE INVENTION

The coal gasification process involves turning coal or other carbon-containing solids into synthesis gas. While both dry coal and water slurry can be used in the gasification process, dry coal pumping is more thermally efficient than current water slurry technology. For example, dry coal gasifiers have a thermal cold gas efficiency of approximately 82%, compared to water slurry gasifiers, which have a thermal cold gas efficiency of between approximately 70% and approximately 77%.

One of the devices currently being used to pump dry coal to a high pressure is the cycling lock hopper. While the thermal cold gas efficiency of cycling lock hopper fed gasifiers is higher than other currently available technology in the gasification field, the mechanical efficiency of the cycling lock hopper is relatively low, approximately 30%. The capital costs and operating costs of cycling lock hoppers are also high due to the high pressure tanks, valves, and gas compressors required in the cycling lock hopper process. Additionally, due to the complexity of the process and the frequency of equipment replacement required, the availability of the cycling lock hopper is also limited. Availability refers to the amount of time the equipment is on-line making product as well as to the performance of the equipment.

In order to simplify the process and increase the mechanical efficiency of dry coal gasification, the use of dry coal extrusion pumps has steadily become more common in dry coal gasification. Some of the problems associated with currently available dry coal extrusion pumps are internal shear failure zones and flow stagnation problems. The presence of failure zones can lead to a decreased mechanical efficiency in the pump. Some proposed solutions to internal shear failure zones and flow stagnation problems are to increase the pump flow rate and to use a linear or axial flow field geometry, rather than a cylindrical solids flow field geometry. While these solutions may increase the mechanical efficiency of the dry coal extrusion pump, other problems still persist.

BRIEF SUMMARY OF THE INVENTION

A pump for transporting particulate material includes an inlet, an outlet, a passageway, a first and second load beam, a first and second scraper seal, and a first and second drive assembly. The inlet introduces the particulate material into the passageway and the outlet expels the particulate material from the passageway. The passageway is defined by a first belt assembly and a second belt assembly that are opposed to each other. The first and second load beams are positioned within the first belt assembly and the second belt assembly, respectively. The first scraper seal and a second scraper seal are positioned proximate the passageway and the outlet. The first drive assembly is positioned within an interior section of the first belt assembly and drives the first belt assembly; and the second drive assembly is positioned within an interior section of the second belt assembly and drives the second belt assembly.

DETAILED DESCRIPTION

The dry coal extrusion pump transports pulverized dry coal and includes an inlet, an outlet, and a passageway positioned between the inlet and the outlet for transporting the pulverized dry coal through the pump. The passageway is defined by a first belt assembly and a second belt assembly that are each formed from a plurality of belt links and link rotation axles. The first and second belt assemblies each have an interior section. The interior section of the first and second belt assemblies include first and second drive assemblies, respectively, which drive the belt assemblies in opposite directions. A first load beam and a second load beam are also positioned within the interior section of the belt assemblies and take the load from the pulverized dry coal and maintain the belt assemblies in a substantially linear form. A first scraper seal and second scraper seal are positioned proximate the outlet and provide a seal between the pressurized interior of the pump and the atmosphere.

Figure 1A:
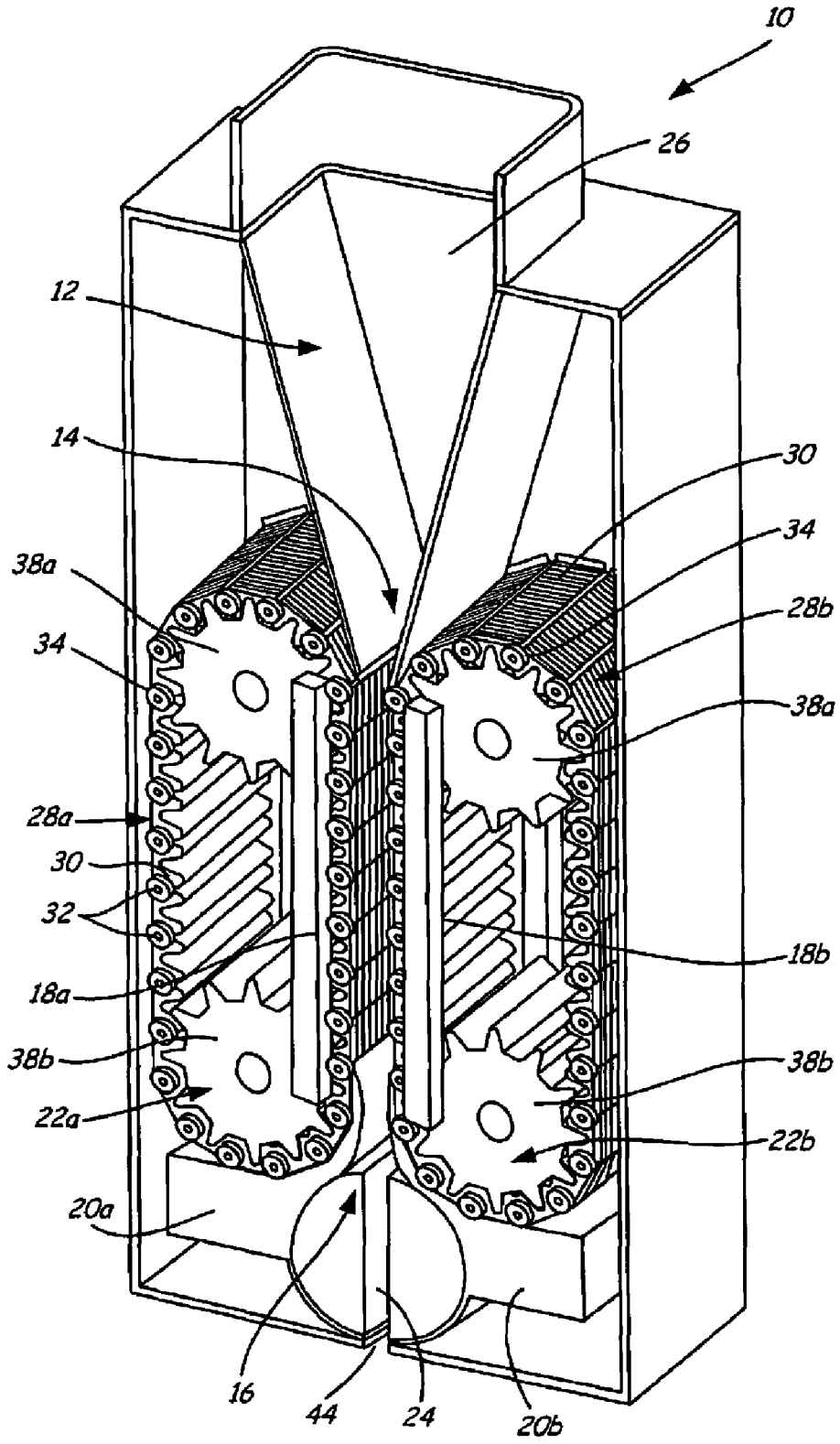
FIG. 1A is a perspective view of a dry coal extrusion pump.
Figure 1B:
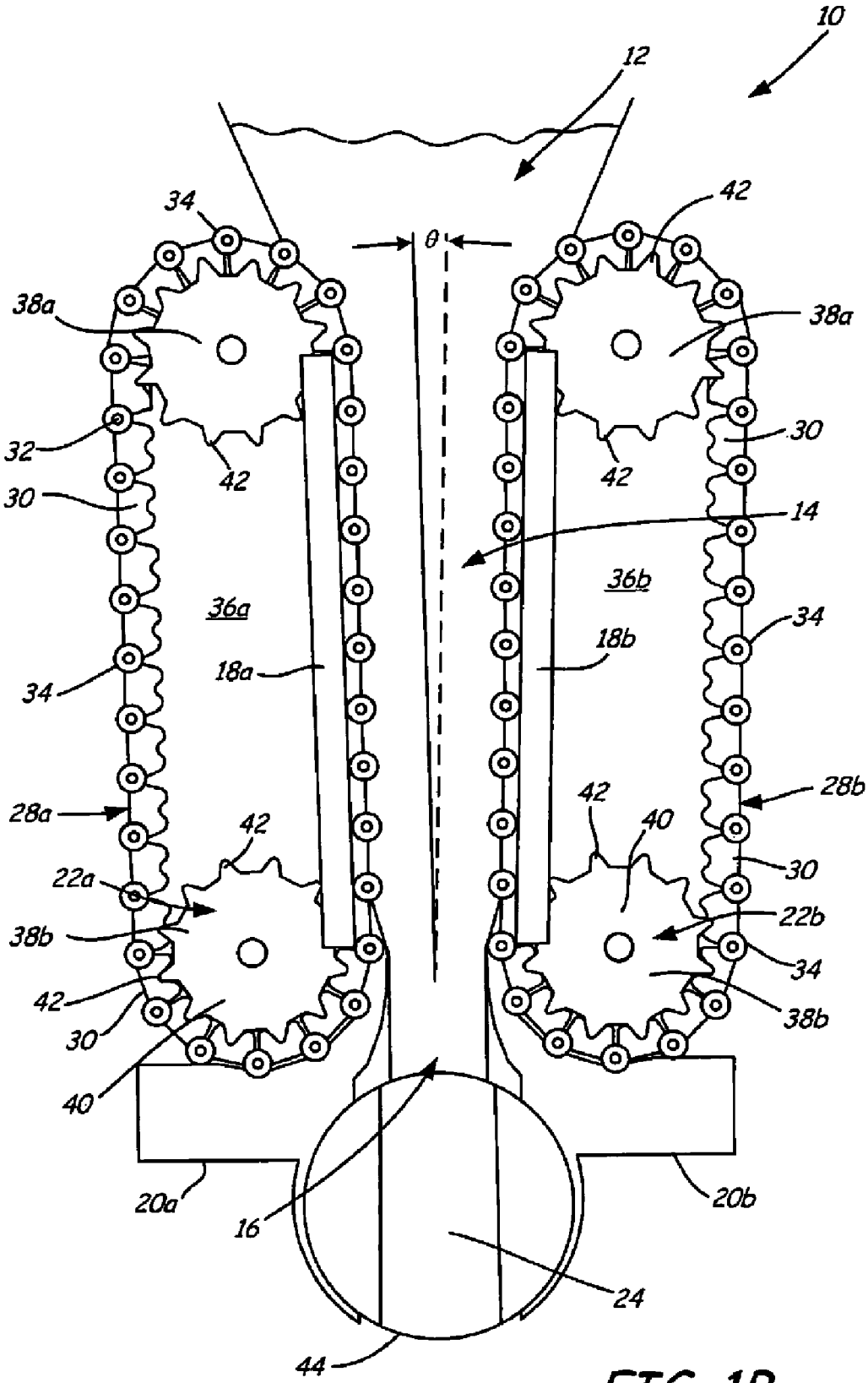
FIG. 1B is a side view of the dry coal extrusion pump.

FIGS. 1A and 1B show a perspective view and a side view, respectively, of a dry coal extrusion pump 10 for transporting pulverized dry coal. Pump 10 has increased efficiency by eliminating shear failure zones and flow stagnation zones within pump 10. Flow stagnation zones occur where pulverized dry coal is driven into walls at substantially right angles or impinged by other pulverized dry coal moving in the opposite direction. By substantially reducing or eliminating shear failure zones and flow stagnation zones, the mechanical efficiency of pump 10 can approach approximately 80%. In addition, pump 10 is capable of pumping pulverized dry coal into gas pressure tanks with internal pressures of over 1200 pounds per square inch absolute. Although pump 10 is discussed as transporting pulverized dry coal, pump 10 may transport any dry particulate material and may be used in various industries, including, but not limited to the following markets: petrochemical, electrical power, food, and agricultural.

Pump 10 generally includes inlet 12, passageway 14, outlet 16, first load beam 18a, second load beam 18b, first scraper seal 20a, second scraper seal 20b, first drive assembly 22a, second drive assembly 22b, valve 24, and end wall 26. Pulverized dry coal is introduced into pump at inlet 12, send through passageway 14, and expelled from pump 10 at outlet 16. Passageway 14 is defined by *at least one belt 28 such as* first belt assembly 28a and second belt assembly 28b, which are positioned substantially parallel and opposed to each other.

First belt assembly 28a is formed from belt links 30 connected to each other by link rotation axles 32 (shown in FIGS. 2A, 2B, and 2C) and track wheels 34. Link rotation axles 32 allow belt links 30 to form a flat surface as well as allow belt links 30 to bend around first drive assembly 22a. First belt assembly 28a defines an inner section 36a in which first drive assembly 22a is located. Track wheels 34 cover ends of link rotation axles 32 and function to transfer the mechanical compressive loads normal to belt links 30 into load beam 18a. In an exemplary embodiment, first belt assembly 28a is formed from between approximately thirty-two (32) and approximately fifty (50) belt links 30 and link rotation axles 32. First belt assembly 28a, together with second belt assembly 28b, pushes the pulverized dry coal through passageway 14.

Second belt assembly 28b includes belt links 30, link rotation axles 32, track wheels 34, and second inner section 36b. Belt links 30, link rotation axles 32, track wheels 34, and second inner section 36b are connected and function in the same manner as belt links 30, link rotation axles 32, track wheels 34, and first inner section 36a of first belt assembly 28a.

First and second load beams 18a and 18b are positioned within first belt assembly 28a and second belt assembly 28b, respectively. First load beam 18a carries the mechanical load from first belt assembly 28a and maintains the section of first belt assembly 28a defining passageway 14 in a substantially linear form The pulverized dry coal being transported through passageway 14 creates solid, stresses on first belt assembly 28a in both a compressive outward direction away from passageway 14 as well as in a shearing upward direction toward inlet 12. The compressive outward loads are carried from belt links 30 into link rotation axles 32, into track wheels 34, and into first load beam 18a. First load beam 18a thus prevents first belt assembly 28a from collapsing into first interior section 36a of first belt assembly 28a as the thy pulverized coal is transported through passageway 14. The shearing upward loads are transferred from belt links 30 directly into drive sprockets 38a and 38b and drive assembly 22a.

Second load beam 18b is formed and functions in the same manner as first load beam 18a to maintain second belt assembly 28b in a substantially linear form at passageway 14 and to transfer outward compressive and upward shearing loads from belt links 30 to second load beam 18b, drive sprockets 38a and 38b, and second drive assembly 22b.

First scraper seal 20a and second scraper seal 20b are positioned proximate passageway 14 and outlet 16. First belt assembly 28a and first scraper seal 20a form a seal between pump 10 and the outside atmosphere. Thus, the few pulverized dry coal particles that become caught between first belt assembly 28a and first scraper seal 20a become a moving pressure seal for first belt assembly 28a. The exterior surface of first scraper seal 20a is designed to make a small angle with the straight section of first belt assembly 28a in order to scrape the pulverized dry coal stream off from moving first belt assembly 28a. The angle prevents pulverized dry coal stagnation that may lead to low pump mechanical efficiencies. In an exemplary embodiment, first scraper seal 20a makes a 15 degree angle with the straight section of first belt assembly 28a. First scraper seal 20a may be made of any suitable material, including, but not limited to, hardened tool steel.

Second scraper seal 20b is formed and functions in the same manner as first scraper seal 20a to prevent stagnation at second belt assembly 28b of pump 10.

First drive assembly 22a [is] *includes at least two drive sprockets 38a and 38b* positioned within *the* first interior section 36a of first belt assembly 28a and drives first belt assembly 28a in a first direction. First drive assembly 22a includes *the* at least two drive sprockets 38a and 38b positioned at opposing ends of first belt assembly 28a. Each of drive sprockets 38a and 38b has a generally circular shaped base 40 with a plurality of sprocket teeth 42 protruding from base 40. Sprockets 42 interact with first belt assembly 28a and drives first belt assembly 28a around drive sprockets 38a and 38b. In an exemplary embodiment, first drive assembly 22a rotates first belt assembly 28a at a rate of between approximately 1 foot per second and approximately 5 feet per second (ft/s). First drive assembly 22a preferably rotates first belt assembly 28a at a rate of approximately 2 ft/s.

Likewise, second drive assembly 22b includes at least two drive sprockets 38a and 38b positioned within second interior section 36b of second belt assembly 28b for driving second belt assembly 28b. Second drive assembly 22b is formed and functions in the same manner as first drive assembly 22a, except that second drive assembly 22b drives second belt assembly 28b in a second direction.

Valve 24 is positioned proximate outlet 16 of pump 10 and is switchable between an open position and a closed position. A slot 44 runs through valve 24 and controls whether the pulverized dry coal may pass through outlet 16 of pump 10 into a discharge tank (not shown) positioned beneath pump 10. The width of slot 44 is larger than outlet 16 between scraper seals 20a and 20b. When valve 24 is in the closed position, slot 44 is not aligned with passageway 14 and outlet 16, preventing the pulverized dry coal from exiting pump 10. Valve 24 is typically in the closed position when first and second belt assemblies 28a and 28b of pump 10 are not rotating. Valve 24 remains in the closed position as pump 10 starts up. Once first and second belt assemblies 28a and 28b begin rotating, valve 24 is rotated 90 degrees to the open position (shown in FIG. 1B). When valve 24 is in the open position, slot 44 is aligned with passageway 14 and outlet 16, allowing the pulverized dry coal in passageway 14 to flow through pump 10 to the discharge tank. In an exemplary embodiment, valve 24 is a cylinder valve.

The distance between sprockets 38a and 38b (in each of first and second drive assembly 22a and 22b), the convergence half angle θ between load beams 18a and 18b, and the separation distance between scraper seals 20a and 20b are optimized to achieve the highest mechanical solids pumping efficiency possible for a particular pulverized material without incurring detrimental solids back flow and blowout inside pump 10. High mechanical solids pumping efficiencies are obtained when the mechanical work exerted on the solids by pump 10 is reduced to near isentropic (i.e., no solids slip) conditions. For a solids pump, the isentropic work per unit mass of solids fed, $W_{isen}$, is given by:

$$W_{isen} = \frac{(P_d - P_{atm})}{\rho_s(1-\varepsilon)} \quad (1)$$

where the $P_d$ is the discharge gas pressure of pump 10, $P_{atm}$ is the atmospheric gas pressure (14.7 psia), $\rho_s$ is the true solids density without voids, and $\epsilon$ is the void fraction within passageway 14.

Detrimental solids back flow and blowout may be prevented by ensuring that the solids stress field within passageway 14 just upstream of scraper seals 20a and 20b is below the Mohr-Coulomb failure condition, or:

$$\left[\frac{(\sigma_x-\sigma_y)^2}{4}+\tau_{xy}^2\right]^{0.5} \le \frac{c}{(1-\varepsilon)}\cos\phi+\frac{(\sigma_x+\sigma_y)}{2}\sin\phi \qquad (2)$$

where the variable $\tau_{xy}$ is the solids shearing stress within passageway 14, $\sigma_x$ is the compressive stress in the outward direction of passageway 14, $\sigma_y$ is the compressive stress in the axial direction of passageway 14, $\phi$ is the pulverized solids internal friction angle, and c is the pulverized solids coefficient of cohension.

Although the solids stress field will meet the Equation 2 equality (failure condition) in the region between scraper seals 20a and 20b where solids slip is occurring over stationary scraper seals 20a and 20b; the primary role of scraper seals 20a and 20b is to generate enough compressive solids pressure, $(\sigma_x+\sigma_y)/2$, in order to prevent solids slip on the moving tractor belt links 30 just upstream of scraper seals 20a and 20b where the shearing stresses, $\tau_{xy}$, are lower.

Additional compressive solids pressure, $(\sigma_x+\sigma_y)/2$, for the prevention of slip just upstream of scraper seals 20a and 20b can be generated by: increasing the distance between sprockets 38a and 38b in each of first and second drive assembly 22a and 22b (for increased length of passageway 14), decreasing the width of passageway 14, or converging load beams 18a and 18b at a half angle, $\theta$, between 0 and 5 degrees. The set of geometrical values to be used for these parameters is determined by the set that achieves the minimum mechanical pump work.

Figure 2:
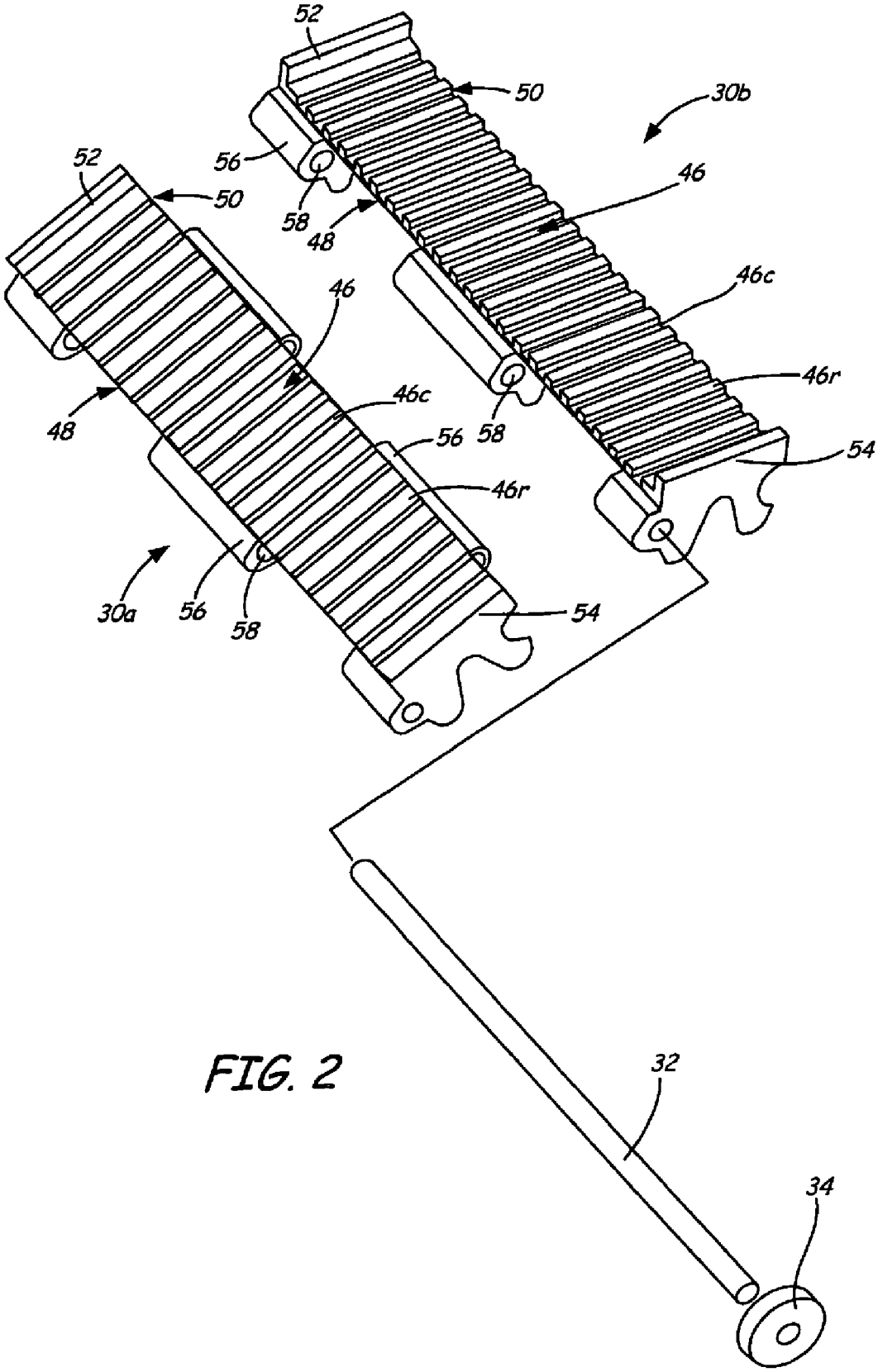
FIG. 2 is enlarged, perspective view of a belt link of the dry coal extrusion pump.

FIG. 2 shows a perspective view of belt link 30a and adjacent belt link 30b each having top surface 46, first side 48, second side 50, first end seal 52, second end seal 54, and protrusions 56. First and second end seals 52 and 54 of belt links 30 have an extended, trapezoidal shape. As can be seen in FIG. 2, top surface 46 of belt links include a series of rectangular cavities 46c and ridges 46r. End seals 52 and 54 protrude higher than top surface 46 and act to seal the pressurized chamber of pump 10 from the outside atmosphere. Protrusions 56 extend from first and second sides 48 and 50 of belt links 30 such that protrusions 56 extending from second side 50 of belt link 30a align with protrusions 56 extending from first side 48 of adjacent belt link 30b. Link rotation axle 32 passes through apertures 58 extending through protrusions 56, allowing belt links 30 to pivot around link rotation axle 32 as belt links 30 travel around drive sprockets 38a and 38b (shown in FIGS. 1A and 1B). Belt links 30 and link rotation axles 32 may be made of any suitable material, including, but not limited to, hardened tool steel.

Figure 3A:
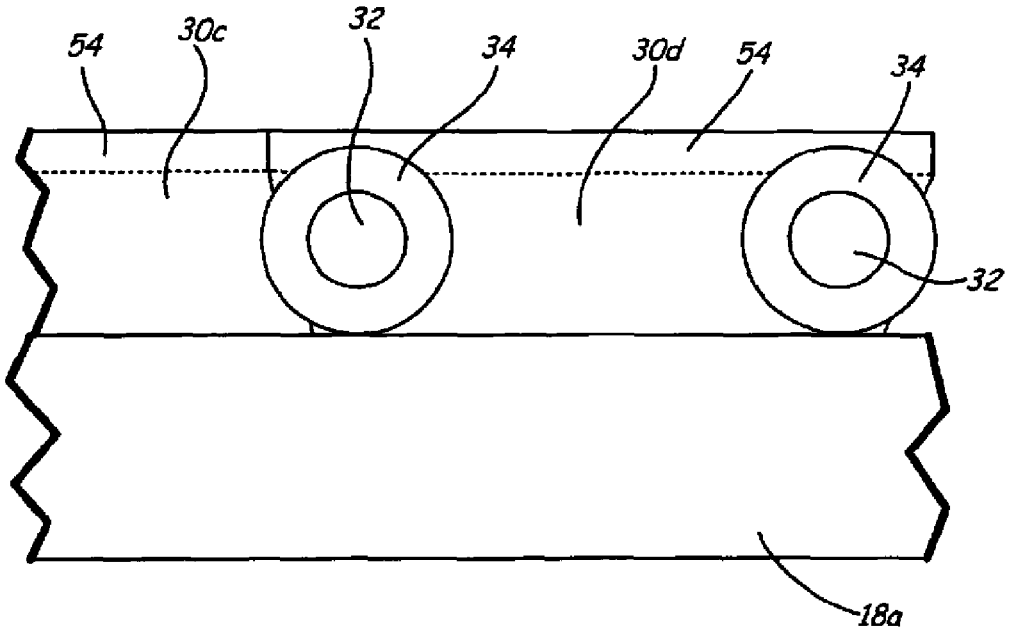
FIG. 3A is a partial, enlarged side view of an exemplary embodiment of an interface of belt links and a load beam.
Figure 3B:
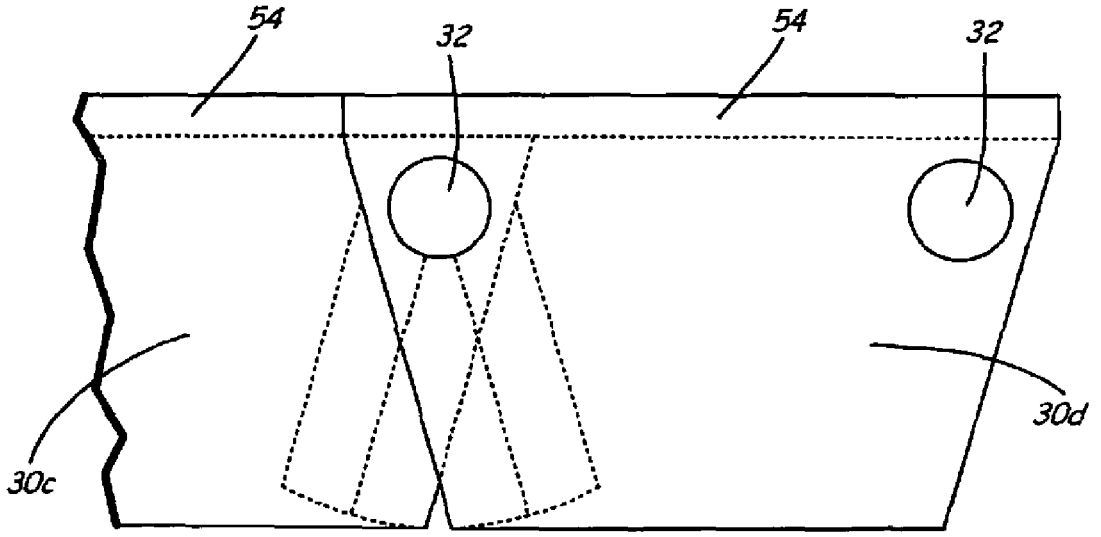
FIG. 3B is a partial, enlarged side view of a belt link and an adjacent belt link of the dry coal extrusion pump with the load beam removed.
Figure 3C:
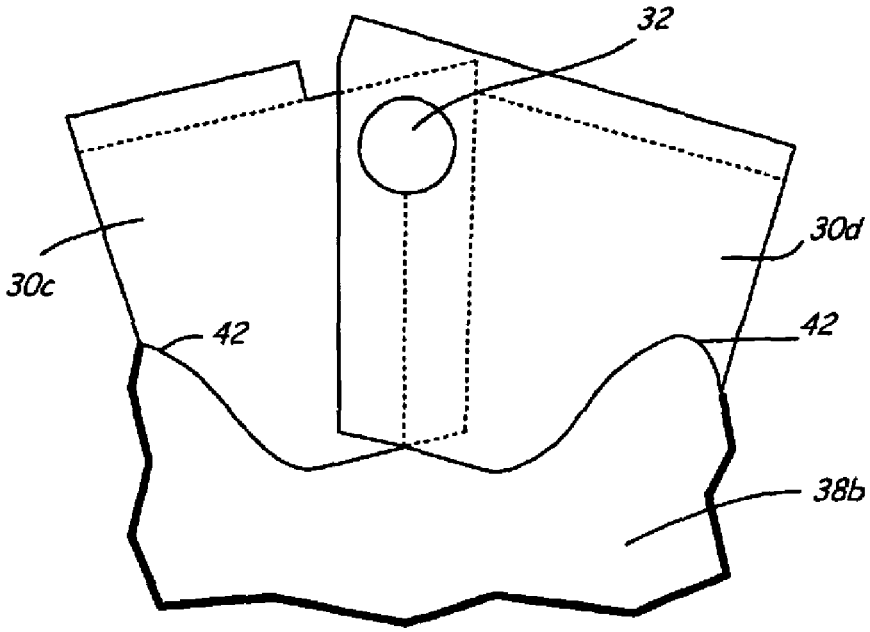
FIG. 3C is a partial, enlarged side view of an exemplary embodiment of an interface of the belt links and a drive sprocket.

FIG. 3A shows an enlarged, partial side view of an exemplary embodiment of an interface of belt links 30 and first load beam 18a. FIG. 3B shows an enlarged, partial side view of an exemplary embodiment of belt link 30c and adjacent belt link 30d with first load beam 18a and track wheels 34 removed. FIG. 3C shows an enlarged, partial side view of an exemplary embodiment of an interface of belt links 30 and drive sprocket 38b with track wheels 34 removed. FIGS. 3A, 3B, and 3C will be discussed in conjunction with each other. Belt links 30 are held together by link rotation axles 32 and track wheels 34. As can be seen in FIG. 3B, link rotation axles 32 allow belt links 30 to form a flat surface between drive sprockets 38b when top surfaces 46 of adjacent belt links 30a and 30b are aligned with each other. The flat surface created by top surfaces 46 of belt links 30 eliminates solids flow stagnation zones by eliminating zones where pulverized dry coal is driven into walls at substantially right angles or impinged by other pulverized dry coal moving in the opposite direction.

As can be seen in FIG. 3C, link rotation axles 32 also allow belt links 30 to bend around each of drive sprockets 38a and 38b of first drive assembly 22a that are driving first belt assembly 28a. The backside of belt links 30 contain a series of cut-outs (shown in dashed lines in FIGS. 3B and 3C) that allow belt link 30c to collapse into an adjacent belt link 30d as first belt assembly 28a moves around sprockets 42 of drive sprockets 38a and 38b. Thus, belt link 30c will have material removed so that belt link 30d can fold into adjacent belt link 30b. Likewise, adjacent belt link 30d will also have material removed so that belt link 30c can fold into adjacent belt link 30d. These cut-outs on backside of belt links 30 allow belt links 30 to fold up on one another in order to go around drive sprocket 38.

Belt links 30, link rotation axles 32, track wheels 34, second load beam 18b, and drive sprockets 38a and 38b of second drive assembly 22b and second belt assembly 28b interact and function in the same manner as belt links 30, link rotation axles 32, track wheels 34, first load beam 18a, and drive sprockets 38a and 38b of first drive assembly 22a and first belt assembly 28a.

Figure 4A:
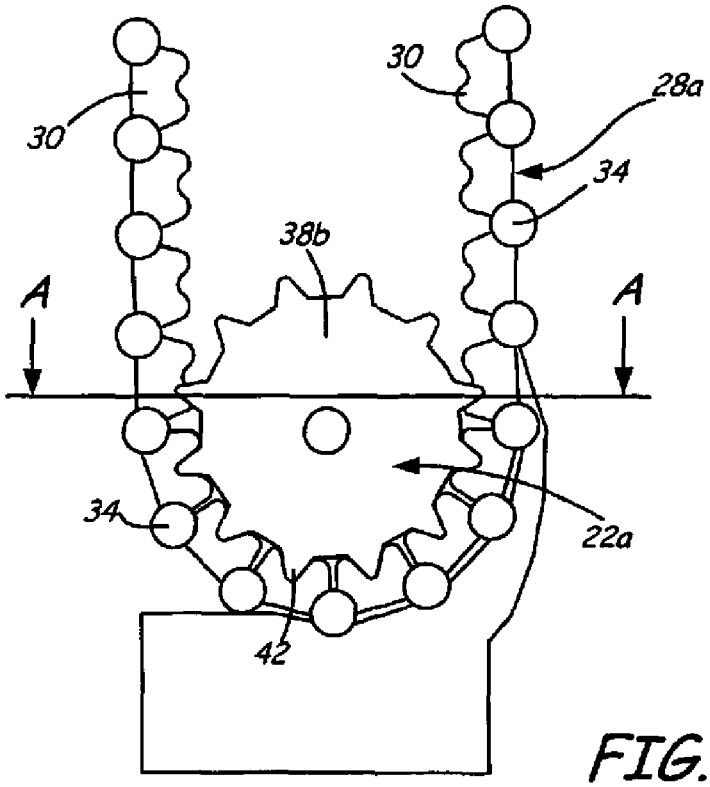
FIG. 4A is a partial side view of a belt link assembly interfacing a drive-sprocket.
Figure 4B:
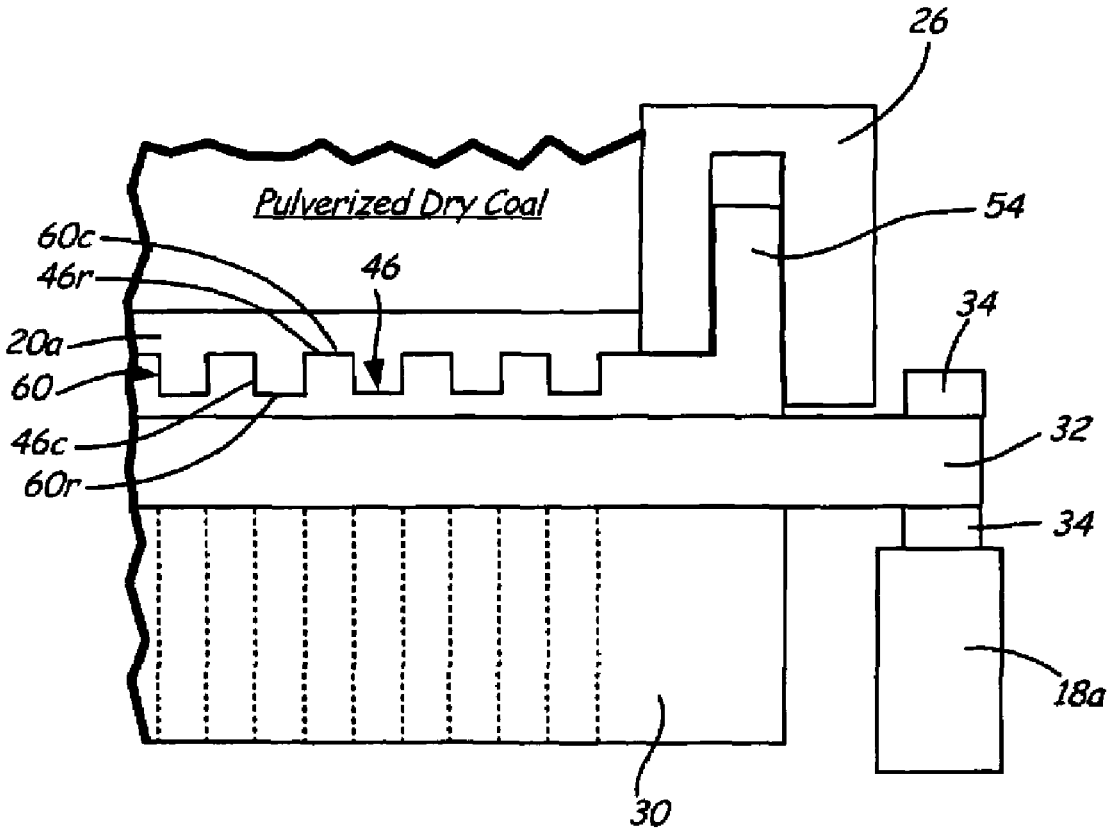
FIG. 4B is a cross-sectional view of an interface of the belt link and a seal scraper at line A-A shown in FIG. 4A.

FIGS. 4A and 4B show a partial side view of first belt link assembly 28a interfacing drive sprocket 38b and a cross-sectional view of an interface of belt link 30 with first scraper seal 20a, respectively. FIG. 4A has first load beam 18a removed to better illustrate the cross-sectional view shown in FIG. 4B. Similar to top surface 46 of belt link 30, interior surface 60 of first scraper seal 20a also includes a series of rectangular cavities 60c and ridges 60c. The series cavities 46c and ridges 46r of top surface 46 of belt link 30 interlock with the series of rectangular cavities 60c and ridges 60r of first scraper seal 20a to form a tight fitting seal that prevents the pulverized dry coal and high pressure gas at outlet 16 from blowing out of pump 10 to the outside ambient pressure environment. End seals 52 and 54 of belt links 30 also interact with end wall 26 to seal the pressurized chamber of pump 10 to the outside atmosphere. The labyrinth seal created by end seals 52 and 54 trap small pulverized dry coal particles and generate enough friction drag between the pulverized dry coal particles and end seals 52 and 54 to prevent excessive pulverized coal or pressurized gas from discharging at end wall 26. The moving/stationary interface between belt links 30 and end wall 26 are thus maintained at a minimum area by filling the region with the pulverized dry coal, which has a very large flow resistance within the interface region of belt links 30 and end wall 26.

Belt links 30 and second scraper seal 20b interact and function in the same manner as belt links 30 and first scraper seal 20a to prevent pulverized dry coal and high pressure gas from escaping pump 10 to the atmosphere.

Although the present invention has been described with reference to preferred embodiments, workers skilled in the art will recognize that changes may be made in form and detail without departing from the spirit and scope of the invention.

The invention claimed is:

1. A pump for transporting particulate material comprising:

a passageway defined by a first belt assembly and a second belt assembly, wherein each of the first belt assembly and the second belt assembly has an interior section and wherein the first belt assembly and the second belt assembly are opposed to each other;

an inlet for introducing the particulate material into the passageway;

an outlet for expelling the particulate material from the passageway;

a first load beam positioned within the interior section of the first belt assembly;

a second load beam positioned within the interior section of the second belt assembly;

a first scraper seal and a second scraper seal positioned proximate the passageway and the outlet;

a first drive assembly positioned within the interior section of the first belt assembly for driving the first belt assembly; and a second drive assembly positioned within the interior section of the second belt assembly for driving the second belt assembly.

2. The pump of claim 1, wherein each of the first belt assembly and the second belt assembly comprises a plurality of belt links pivotally connected to each other by a plurality of link rotation axles.

3. The pump of claim 2, and further comprising a first labyrinth seal at an interface between the first belt assembly and the first scraper seal, and a second labyrinth seal at an interface between the second belt assembly and the second scraper seal.

4. The pump of claim 1, wherein each of the first drive assembly and the second drive assembly comprises at least two drive sprockets.

5. The pump of claim 1, wherein the first belt assembly and the second belt assembly rotate in opposing directions.

6. The pump of claim 1, wherein the first scraper seal and the second scraper seal in combination with a portion of the particulate material form a seal for the pump.

7. The pump of claim 1, and further comprising a valve positioned proximate the outlet of the pump.

8. The pump of claim 1, wherein the first load beam and the second load beam converge at half angles between about 0 and about 5 degrees.

9. A particulate transporting pump having reduced shearing zones, the particulate transporting pump comprising:

a first end for introducing particulates;

a second end for expelling the particulates;

a first belt assembly positioned between the first end and the second end;

a second belt assembly positioned between the first end and the second end, wherein the first belt assembly and the second belt assembly are positioned opposite each other to form a particulate passageway;

a first load beam for carrying load from the first belt assembly;

a second load beam for carrying load from the second belt assembly;

a plurality of scraper seals for forming a seal within the particulate transporting device; and a driving mechanism for transporting the particulates through the passageway from the first end to the second end.

10. The pump of claim 9, wherein each of the first belt assembly and the second belt assembly comprises a plurality of belt links pivotally connected to each other by a plurality of link rotation axles, and wherein each of the first belt assembly and the second belt assembly has an interior section.

11. The pump of claim 10, wherein the driving mechanism comprises a plurality of drive sprockets positioned within the interior sections of the first belt assembly and the second belt assembly.

12. The pump of claim 9, and further comprising an end wall for forming a first labyrinth seal between the first belt assembly and the first scraper seal, and for forming a second labyrinth seal between the second belt assembly and the second scraper seal.

13. The pump of claim 9, wherein the driving mechanism transports the particulates under pressure.

14. The pump of claim 9, wherein the first scraper seal is positioned adjacent the first belt assembly and the second end, and wherein the second scraper seal is positioned adjacent the second belt assembly and the passageway.

15. The pump of claim 9, and further comprising a valve positioned at the second end.

16. The pump of claim 9, wherein the first belt assembly and the second belt assembly rotate in opposite directions.

17. The pump of claim 9, wherein the first load beam and the second load beam converge at half angles between about 0 and about 5 degrees.

18. A method of pumping particulates comprising:

feeding the particulates into an inlet;

driving the particulates through a passageway defined a first belt assembly and a second belt assembly;

supporting the passageway while driving the particulates through the passageway;

scraping particulates from the first belt assembly and the second belt assembly to form a seal, respectively; and expelling the particulates from an outlet.

19. The method of claim 18, wherein driving the particulates through a passageway defined by a first belt assembly and a second belt assembly comprises rotating the first belt assembly in a first direction and rotating the second belt assembly in a second direction.

20. The method of claim 19, wherein rotating the first belt assembly in a first direction and the second belt assembly in a second direction comprises using a plurality of drive sprockets positioned within the first belt assembly and the second belt assembly.

21. The method of claim 18, wherein supporting the passageway comprises a positioning a first load beam within the first belt assembly and positioning a second load beam within the second belt.

22. The method of claim 21, wherein the first load beam and the second load beam converge at half angles between about 0 and about 5 degrees.

23. The method of claim 18, wherein scraping particulates from the first belt assembly and the second belt assembly to form a seal comprises using a first scraper seal and a second scraper seal, respectively.

*24. A pump for transporting particulate material comprising:*

*a passageway defined in part by a belt;*

*a load beam positioned within an interior section of the belt, said load beam operable to at least partially carry an upward shearing load along the passageway from the belt;*

*a scraper seal adjacent said belt; and*

*a drive operable to drive said belt.*

*25. The pump as recited in claim 24, wherein the belt is maintained in a substantially linear form by said load beam.*

*26. The pump as recited in claim 24, wherein the belt and the scraper seal form a seal between the passageway and an outside atmosphere.*

*27. The pump as recited in claim 24, wherein the belt includes an end seal which interacts with an end wall to seal a pressurized interior of said pump from atmosphere.*

*28. The pump as recited in claim 24, wherein the belt includes a belt assembly having a plurality of belt links pivotally connected to each other.*

*29. The pump as recited in claim 24, wherein the passageway is defined between the belt and another belt which define the passageway.*

*30. The pump as recited in claim 24, further comprising a first drive assembly positioned within an interior section of the belt for driving the belt.*

*31. The pump as recited in claim 24, wherein the passageway is arranged generally vertically with respect to gravity.*

*32. The pump as recited in claim 24, wherein the load beam supports an outward compressive load from within the passageway.*

*33. A pump for transporting particulate material comprising:*

*a passageway defined in part by a first belt and a second belt;*

*a first scraper seal adjacent said first belt proximate said passageway and an outlet from said passageway;*

*a second scraper seal adjacent said second belt proximate said passageway and said outlet from said passageway;*

*a drive operable to drive said first belt and a drive operable to drive said second belt.*

*34. The pump as recited in claim 33, wherein said first scraper seal is directly opposed to said second scraper seal.*

*35. A pump for transporting particulate material comprising:*

*a passageway defined in part by a belt, said belt includes an end seal which interacts with an end wall of the pump to seal a pressurized interior of the pump from atmosphere;*

*a scraper seal adjacent said belt proximate said passageway and an outlet from said passageway; and*

*a drive operable to drive said belt.*

* * * * *

UNITED STATES PATENT AND TRADEMARK OFFICE

CERTIFICATE OF CORRECTION

PATENT NO. : RE42,844 E
APPLICATION NO. : 12/326066
DATED : October 18, 2011
INVENTOR(S) : Sprouse et al.

It is certified that error appears in the above-identified patent and that said Letters Patent is hereby corrected as shown below:

On the Title Page:

Item [64], Replace sub-heading, PCT Filed: with sub-heading, Filed.

Signed and Sealed this
First Day of November, 2011

David J. Kappos

David J. Kappos
*Director of the United States Patent and Trademark Office*